United States Patent

Chan et al.

[15] 3,644,829
[45] Feb. 22, 1972

[54] APPARATUS FOR MEASURING ELECTRICAL CHARACTERISTICS OF A SPECIMEN IN WHICH TESTING ELECTRODES ARE AUTOMATICALLY LOWERED RAPIDLY AND THEN SLOWLY INTO CONTACT WITH THE SPECIMEN

[72] Inventors: Joseph Y. Chan, Chelmsford; Dinesh C. Gupta, Cambridge, both of Mass.

[73] Assignee: GTE Laboratories Incorporated

[22] Filed: Dec. 22, 1969

[21] Appl. No.: 886,908

[52] U.S. Cl. ...................................324/158 P, 324/72.5
[51] Int. Cl. .................................................G01r 31/26
[58] Field of Search..............324/73, 73 AT, 158 T, 158 D, 324/158 P, 158 F, 64, 72.5

[56] References Cited

UNITED STATES PATENTS 3,311,819  3/1967  Miller..................................324/158 P
3,344,351  9/1967  Simonyan............................324/73 X Primary Examiner—Michael J. Lynch
Attorney—Irving M. Kriegsman

[57] ABSTRACT

Apparatus for bringing testing electrodes into contact with a specimen with a uniform, consistent, reproducible force of impact. The apparatus lowers the electrodes rapidly during a first portion of their downward movement and then, when the electrodes have reached a predetermined position, at a slow speed. The change of speed occurs at the same precisely controlled predetermined position each time the electrodes are lowered. After the electrodes have come into contact with the specimen and have reached a predetermined lowered position, the downward motion is stopped abruptly. Stopping of the downward movement occurs at the same precisely controlled predetermined lowered position each time the electrodes are lowered.

7 Claims, 6 Drawing Figures 3,644,829

INVENTORS
JOSEPH Y. CHAN
DINESH C. GUPTA

BY David M. Keay

AGENT

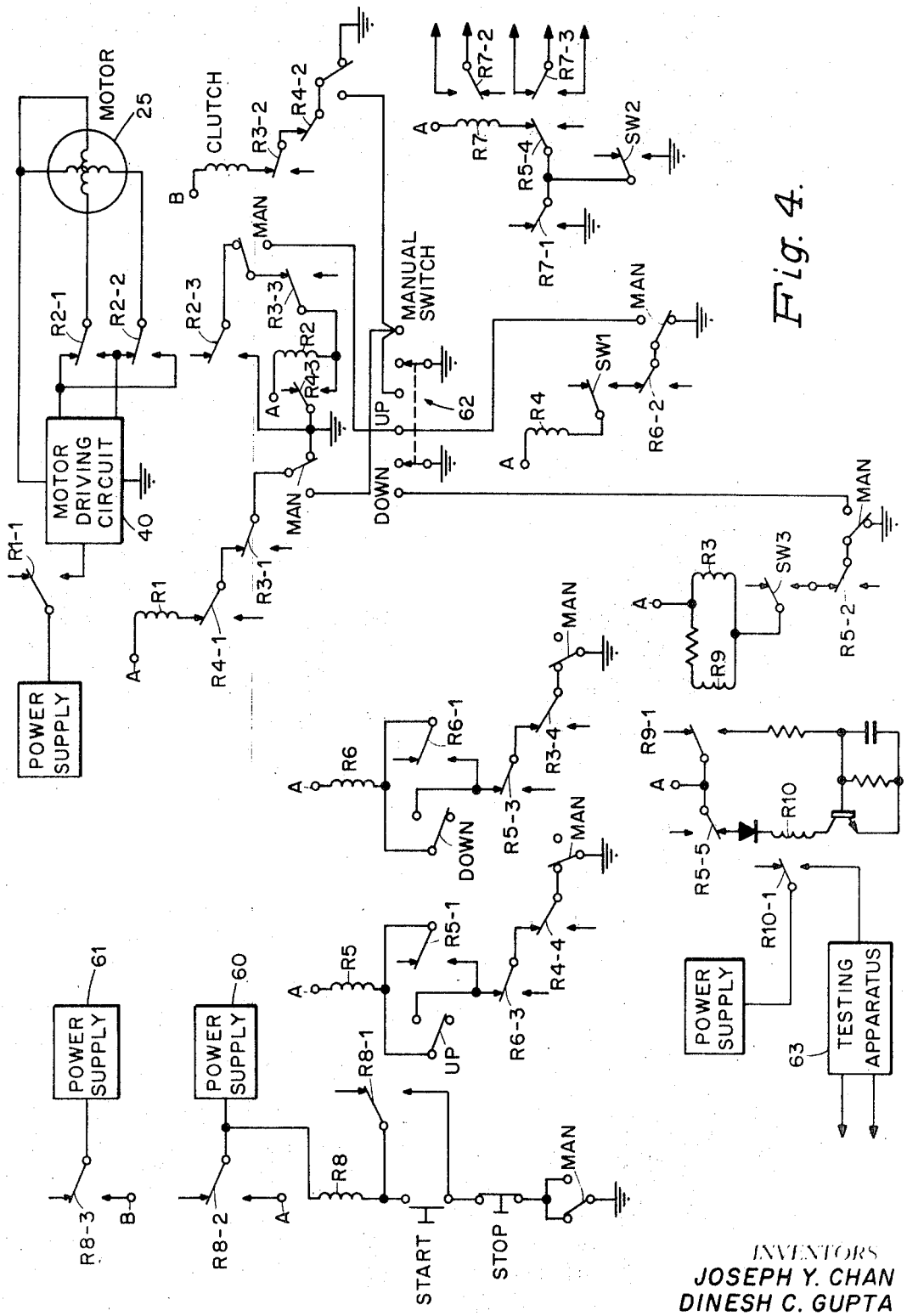

|  | R1 | R2 | R3 | R4 | R5 | R6 | R7 | R8 | R9 | R10 | CLUTCH | SW1 | SW2 | SW3 |
|---|---|---|---|---|---|---|---|---|---|---|---|---|---|---|
| | | | | | RELAYS | | | | | | | CAM OPERATED SWITCHES | | |
| MOMENTARILY CLOSE START SWITCH | OFF | ON | OFF | ON | OFF | OFF | OFF | ON | OFF | OFF | OFF | CLOSED | OPEN | OPEN |
| MOMENTARILY CLOSE DOWN SWITCH | ON | ON | OFF | OFF | OFF | ON | OFF | ON | OFF | OFF | ON | CLOSED OPEN | OPEN | OPEN |
| SWITCH SW2 CLOSED MOMENTARILY | ON | ON | OFF | OFF | OFF | ON | ON | ON | OFF | OFF | ON | OPEN | CLOSED OPEN | OPEN |
| SWITCH SW3 CLOSED | OFF | OFF | ON | OFF | OFF | OFF | ON | ON | ON | ON (DELAY) | OFF | OPEN | OPEN | CLOSED |
| CONDUCT TEST | | | | | | | | | | | | | | |
| MOMENTARILY CLOSE UP SWITCH | ON | OFF | OFF | OFF | ON | OFF | OFF | ON | OFF | OFF | ON | OPEN | OPEN | CLOSED OPEN |
| SWITCH SW1 CLOSED | OFF | ON | OFF | ON | OFF | OFF | OFF | ON | OFF | OFF | OFF | CLOSED | OPEN | OPEN |

*Fig. 5.*

INVENTORS
JOSEPH Y. CHAN
DINESH C. GUPTA

BY David M. Keay
AGENT

APPARATUS FOR MEASURING ELECTRICAL CHARACTERISTICS OF A SPECIMEN IN WHICH TESTING ELECTRODES ARE AUTOMATICALLY LOWERED RAPIDLY AND THEN SLOWLY INTO CONTACT WITH THE SPECIMEN

BACKGROUND OF THE INVENTION

This invention relates to measuring apparatus. More particularly, it is concerned with apparatus useful in measuring the electrical resistivity of specimens of semiconductor material.

Various techniques are employed in measuring the resistivity of semiconductor materials. One technique which is nondestructive and useful over a wide range of resistivities is the spreading resistance probe technique. An improved method of measuring resistance employing this technique is described and claimed in application Ser. No. 886,974, filed concurrently herewith by Joseph Y. Chan and Dinesh C. Gupta entitled "Apparatus and Method for Measuring Electrical Resistance" and assigned to the assignee of the present invention.

Among the factors which influence the accuracy to which resistivity can be measured are the mechanical aspects of making contact between the test electrodes and the specimen. In order to obtain accurate, reproducible, measurements the electrodes should come into contact with the same force of impact and the same loading for each measurement.

SUMMARY OF THE INVENTION

Apparatus in accordance with the invention brings testing electrodes into contact with a specimen with a controlled, uniform, force of impact and loading. The apparatus includes a support for holding a specimen and electrodes for contacting a specimen in position on the support. The electrodes are supported in an electrode mounting structure which is moved by a driving means from a raised position to a lowered position at which the electrodes contact the specimen on the support. Speed control means are employed to cause the driving means to move the electrode mounting structure downward from the raised position to an intermediate position at a predetermined distance from the support at a first rate of speed, and to move the electrode mounting structure downward from the intermediate position to the lowered position at a rate of speed which is less than the first rate.

BRIEF DESCRIPTION OF THE DRAWINGS

Additional objects, features, and advantages of apparatus according to the invention will be apparent from the following detailed discussion and the accompanying drawings wherein:

FIG. 4 is a schematic circuit diagram of the control system of the apparatus; and FIG. 5 is a table for use in explaining the operation of the apparatus during an operating cycle.

DETAILED DESCRIPTION OF THE INVENTION

Figure 1A:
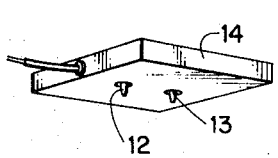
FIG. 1A is a detailed view in perspective of a portion of the apparatus illustrated in FIG. 1.
Figure 1:
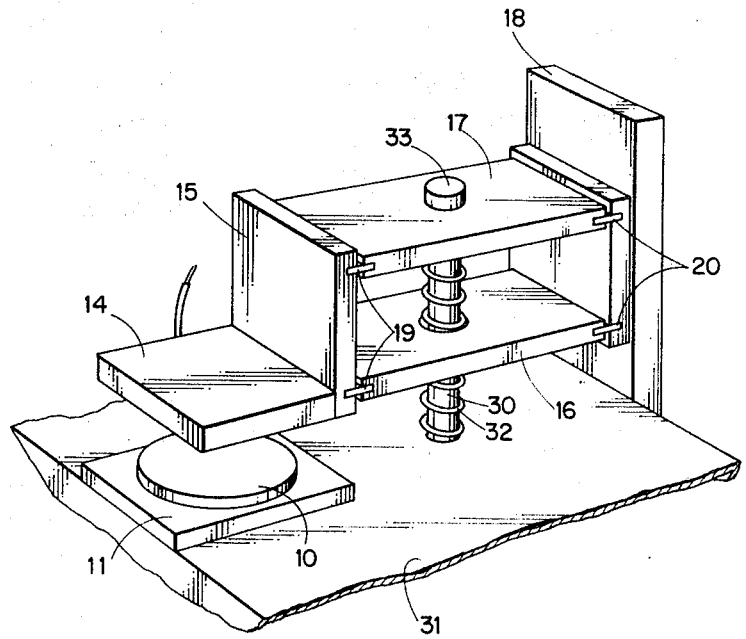
FIG. 1 is a partial view in perspective of apparatus in accordance with the invention for measuring the electrical characteristics of a specimen.
Figure 2:
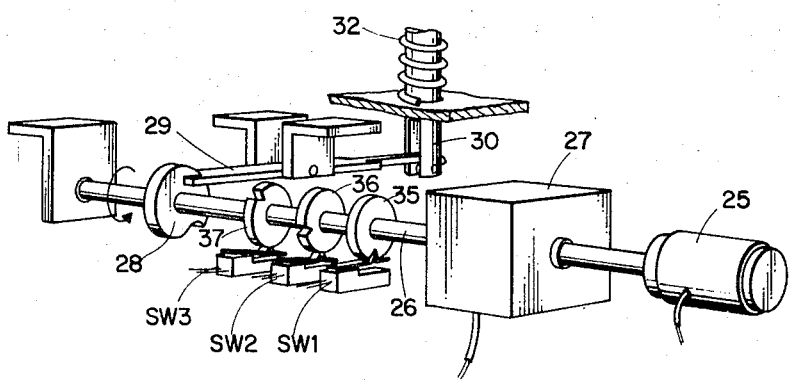
FIG. 2 is a perspective view illustrating other portions of the apparatus.

Apparatus in accordance with the invention for measuring electrical characteristics of a specimen is illustrated in FIGS. 1 and 2. A specimen 10 to be tested, for example, a wafer of semiconductor material, is placed on a support 11. As illustrated in FIG. 1A a pair of probes or electrodes 12 and 13 for making contact to the surface of the specimen are supported in a measuring head or electrode-mounting structure 14 with a spring-loaded mounting arrangement. The electrodes are electrically connected to testing apparatus, for example, resistance-measuring apparatus of the type described and claimed in the aforementioned application filed concurrently herewith entitled "Apparatus and Method for Measuring Electrical Resistance."

The measuring head 14 is fixed to a member 15. Two horizontal plates 16 and 17 are attached at opposite ends to the member 15 and to a fixed support 18 by sets of flexible straps 19 and 20. The measuring head is raised and lowered by a driving train as illustrated in FIG. 2 including a reversible synchronous electrical motor 25 coupled to a shaft 26 through a conventional arrangement 27 of speed reducing gears and an electrically operated clutch. A driving cam 28 fixed to the shaft 26 engages one end of a lever arm 29. The lever arm 29 is pivotally mounted at its midpoint, and its opposite end extends between the legs of a bifurcated rod 30 and bears against a pin through the legs. The rod 30 extends vertically upward through openings in the housing 31 and in the two horizontal plates 16 and 17 as shown in FIG. 1. A compression spring 32 positioned between the housing 31 and the upper plate 17 urges the plates upward against a stop 33 fixed to the upper end of the rod 30.

When the motor 25 operates to rotate the shaft 26 in the direction indicated by the arrow in FIG. 2, the driving cam 28 pivots the lever arm 29 about its fulcrum pulling the rod 30 downward. The plates 16 and 17 are pivoted downward about the flexible straps 20, which attach the plates to the fixed support 18, thus lowering the measuring head 14 and compressing the compression spring 32. When the motor 25 operates to rotate the shaft 26 in the opposite direction, the configuration of the driving cam 28 permits the compression spring 32 to urge the plates 16 and 17 upward thus raising the measuring head.

Fixed to the shaft 26 are three switching cams 35, 36, and 37 which are arranged so as to permit the contacts of three microswitches SW1, SW2, and SW3, respectively, to close at certain points during an operating cycle of the apparatus. The functions of these switches in controlling the operation of the apparatus will be explained hereinbelow.

Figure 3:
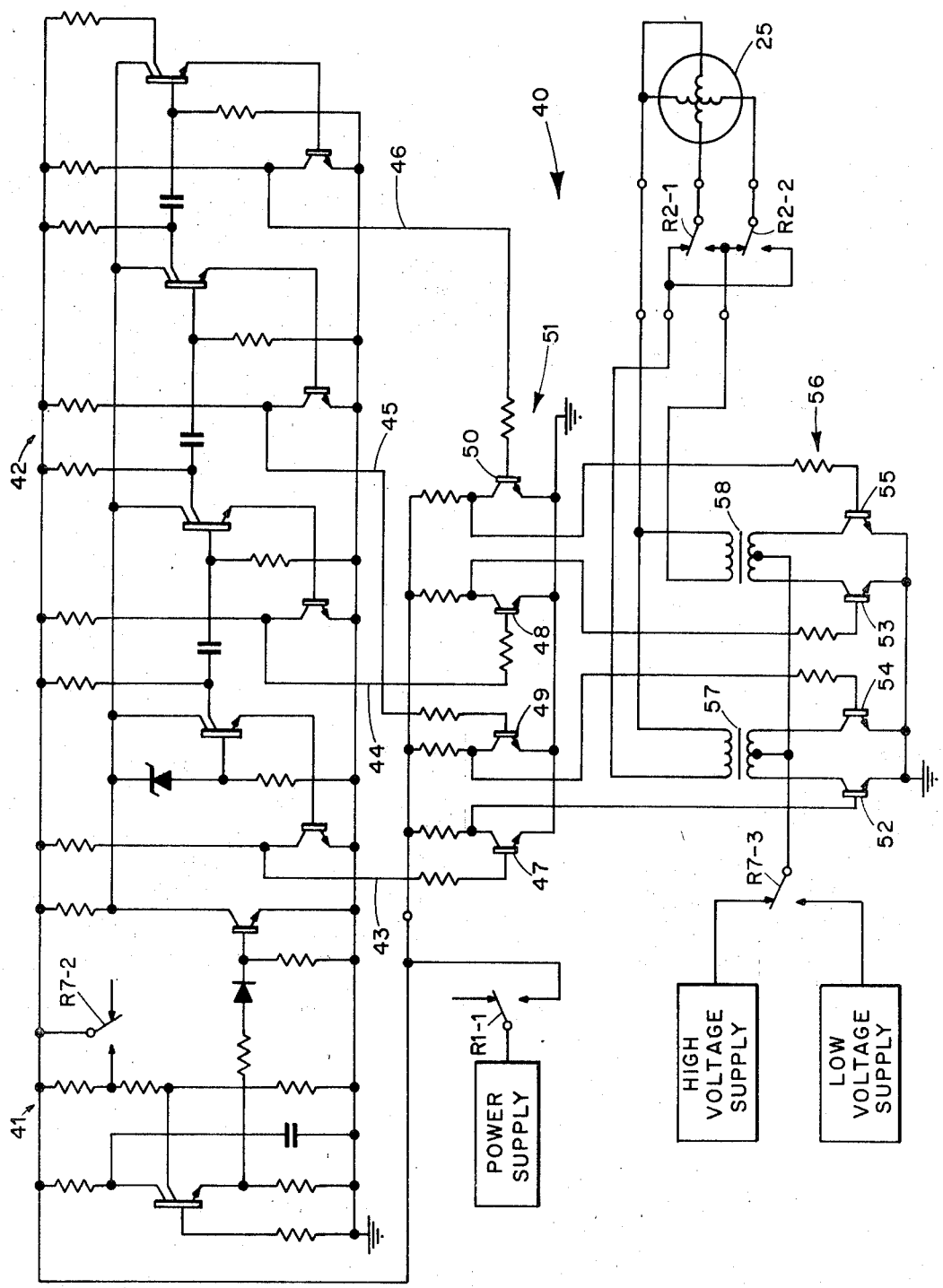
FIG. 3 is a detailed schematic circuit diagram of the motor driving circuit of the apparatus.

The motor 25 is driven by the motor-driving circuit 40 shown in schematic circuit diagram form in FIG. 3. The motor 25 as illustrated is a reversible, two-phase synchronous electrical motor. The speed of the motor is determined by the frequency of the electrical power supplied to the motor.

The motor driving circuit 40 includes an oscillator section 41 which produces a succession of negative-going trigger pulses. These trigger pulses are applied to a distributing section 42 which produces a negative-going pulse at each of four output lines 43, 44, 45, and 46 in succession. Each trigger pulse from the oscillator section 41 causes the output pulse to be shifted from one output line to the next in succession. The output lines 43, 44, 45, and 46 are connected to transistors 47, 48, 49, and 50 respectively, in an inverting and amplifying section 51.

The pulses are then applied to transistors 52, 53, 54, and 55, respectively, of a driving section 56. The first and third transistors 52 and 54 are connected across the primary winding of a first center-tapped transformer 57 and the second and fourth transistors 53 and 55 are connected across the primary winding of a second center-tapped transformer 58. One end of the secondary winding of each transformer is connected together and to one end of both sets of windings in the synchronous motor 25. The other end of the secondary winding of each transformer is connected to the other end of different ones of the two sets of motor windings. Thus, the first and third pulses of each sequence of signal pulses from the distributing section 51 are applied across one set of windings in the motor and the second and fourth pulses are applied across the other set of windings of the synchronous motor.

In FIG. 3 relay contacts labeled R2–1 and R2–2 are shown in their normally biased position which causes the motor to rotate in one direction, the direction which raises the measuring head 14. When these contacts are closed in the other position, the motor rotates in the opposite direction and lowers the measuring head 14.

The speed of rotation of the synchronous motor is determined by the frequency of the input voltage which in turn is determined by the oscillating frequency of the oscillator section 41. The oscillator section 41 operates to produce trigger pulses at a first frequency when relay contacts R7-2 are in their normally biased position as shown in FIG. 3. When the contacts R7-2 are closed, the operating frequency is reduced. Relay contacts R7-3 are switched simultaneously with the contacts R7-2 in order to provide an appropriate voltage across the motor windings for the particular operating speed.

The motor driving circuit 40 as described briefly hereinabove is disclosed in greater detail and claimed in application Ser. No. 886,973 by Joseph Y. Chan and Dinesh C. Gupta, filed concurrently herewith, entitled "Pulse Generating Apparatus" and assigned to the assignee of the present invention.

The apparatus is controlled during an operating cycle by the relay switching arrangement illustrated schematically in FIG. 4. The sets of contacts associated with the relays are shown in FIG. 4 in their normally biased position with the relays not energized. Microswitches SW1, SW2, and SW3 are shown in their normally biased positions when not actuated by the switching cams 35, 36, and 37, respectively. The terminals labeled A of the relays are each connected directly to the terminal labeled A from a power supply 60. Terminal B of the electrically operated clutch is connected directly to terminal B from another power supply 61. FIG. 5 is a table which indicates the operating states of the various relays, either energized (ON) or deenergized (OFF), and the conditions of the microswitches SW1, SW2, and SW3, either OPEN or CLOSED, at various times during one complete cycle of operation of the apparatus.

During normal operation the manual switch 62 is set at its neutral position. Various other switches are set as shown in FIG. 4 and not in their manual (MAN) position. Under usual operating conditions a cycle starts with the measuring head 14 in its raised position, and with the first switching cam 35 closing microswitch SW1. When the START switch is momentarily closed, current flows from the power supply 60 through relay R8 to ground thus energizing relay R8 and closing contacts R8-1, R8-2, and R8-3. Power is therefore available to all the relays and to the clutch, and relay R8 remains energized when the START switch is reopened. Relays R5 and R6 are deenergized. Since switch SW1 is closed, relay R4 is energized. Thus contacts R4-1 are open, R4-2 are open, R4-3 are closed, and R4-4 are open.

Since contacts R4-1 and R4-2 are open, relay R1 and the clutch are deenergized and the motor 25 does not operate. With contacts R4-3 closed, relay R2 is energized causing contacts R2-1 and R2-2 to switch to the position to cause the motor 25 to rotate in the direction which will drive the measuring head 14 downward when power is applied to the motor. Contacts R2-3 are also closed holding relay R2 energized.

When the DOWN switch is momentarily closed, relay R6 is energized and contacts R6-1 are closed holding relay R6 energized, contacts R6-2 are opened, deenergizing relay R4, and contacts R6-3 are opened, preventing relay R5 from being energized. With relay R4 deenergized, contacts R4-1 and R4-2 are closed causing relay R1 and the electrically operated clutch to be energized. Contacts R4-3 are opened and contacts R4-4 are closed. When relay R1 becomes energized, contacts R1-1 are closed and power is supplied to the motor driving circuit 40. Since relay R2 is energized, the motor rotates in the direction to cause the measuring head 14 to lower. Since relay R7 is deenergized, the motor operates at a relatively high speed. As the shaft 26 starts to rotate in the direction of the arrow in FIG. 2 lowering the measuring head 14, the first switching cam 35 rotates and switch SW1 is opened.

The measuring head 14 is lowered by the driving motor 25 at a relatively high rate of speed until the second switching cam 36 momentarily closes the second microswitch SW2. The second switching cam 36 is fixed to the shaft so that this action occurs when the measuring head 14 is at a point closely adjacent but spaced from the specimen. When the second microswitch SW2 closes momentarily, relay R7 is energized closing contacts R7-1 and R7-2, and switching the connections at contacts R7-3. Thus, relay R7 remains energized after the momentary closing of switch SW2, and as illustrated in the motor driving circuit 40 of FIG. 3, the frequency of the oscillator section 41 is reduced and the voltage applied to the driving section 56 is reduced so that the current through the motor windings is reduced. Thus, the motor 25 operates at a relatively low speed.

The motor 25 continues to operate, at the slower speed, lowering the measuring head 14 until the electrodes 12 and 13 come in contact with the specimen 10 and the springs mounting the electrodes in the measuring head are slightly compressed. The third switching cam 37 is mounted on the shaft so that at this point the cam closes the third microswitch SW3. When switch SW3 is closed, relay R3 is energized opening contacts R3-1, R3-2, R3-3, and R3-4. Relays R1, R2, R6, and the electrically operated clutch are therefore deenergized, immediately stopping the motor and decoupling the motor 25 from the shaft 26 and measuring head 14, and thus insuring no further downward movement of the measuring head.

The closing of the third microswitch SW3 also energizes relay R9 causing contacts R9-1 to close. The circuit for energizing relay R10 is thereby completed and after a delay determined by the values of the circuit components (approximately 3 seconds) relay R10 becomes energized closing contacts R10-1. Power is thus supplied to the testing apparatus 63 which is connected to the pair of electrodes 12 and 13. Since the electrodes make firm contact with the specimen before power is applied to them, electrical arcing and any consequent damage to the specimen is prevented. The testing apparatus may be of the type for measuring resistance as disclosed and claimed in the aforementioned application entitled "Apparatus and Method for Measuring Electrical Resistance."

Upon completion of the test procedure on the specimen 10, the UP switch is momentarily closed energizing relay R5 and thus closing contacts R5-1 and opening contacts R5-2, R5-3, R5-4, and R5-5. The closing of contacts R5-1 holds relay R5 energized and the opening of contacts R5-3 prevents relay R6 from being energized. When contacts R5-4 and R5-5 are opened, relays R7 and R10 are deenergized. The opening of contacts R10-1 turns off the power applied to the electrodes 12 and 13 before the electrodes break contact with the specimen. The opening of contacts R5-2 deenergizes relays R3, R9, and also R10. When relay R3 is deenergized contacts R3-1 and R3-2 are closed energizing relay R1 and the electrically operated clutch. Thus, the motor 25 operates and is coupled to the shaft 26. Since relays R7 and R2 are both deenergized, the motor operates at the relatively high speed and rotates the shaft 26 in the direction opposite to the arrow as shown in FIG. 2 thus raising the measuring head 14. As the shaft 26 rotates, the third switching cam 37 clears the third microswitch SW3 and the switch opens.

The measuring 14 moves rapidly upward to the raised position at which point the first switching cam 35 closes the first microswitch SW1. Relay R4 becomes energized opening contacts R4-1 and R4-2 and thus stopping the motor 25 and deenergizing the clutch. Contacts R4-4 are also opened deenergizing relay R5. Contacts R4-3 are closed energizing relay R2, thereby causing contacts R2-1, R2-2, and R2-3 to switch whereby the motor 25 will lower the measuring head when power is reapplied. Thus an operating cycle of the apparatus is completed and the apparatus is in readiness to repeat the cycle in the same manner in response to a momentary closing of the DOWN switch.

The apparatus operates to return the measuring head 14 directly to the raised position at the relatively high speed whenever the cycle is interrupted by momentary opening of the STOP switch and subsequent momentary closing of the START switch. Opening of the STOP switch deenergizes all of the relays and the clutch. When the START switch is reclosed, only relays R8 and R1 and the clutch become energized. The motor 25 operates in the direction to return the measuring head 14 to the raised position. When the measuring head reached the raised position, the first switching cam 35 closes the first microswitch SW1 providing the same result as explained previously.

It is also possible to switch the apparatus to manual operation in order to move the measuring head upward or downward to the extent desired as for checking-out or trouble-shooting purposes.

The apparatus as described operates to provide a consistent, uniform, reproducible force of impact each time the electrodes make contact with a specimen. Relatively high-speed operation of the motor saves time in raising and lowering the measuring head during noncritical periods of a cycle. At a predetermined point during the downward movement the motor changes speed to operate very slowly at a precise speed which is accurately controlled by the frequency of the pulses applied to the synchronous motor. Downward movement of the measuring head is stopped abruptly by deenergizing the clutch at the same instant that power is removed from the motor, thus preventing any possibility of uncontrolled overrunning of the driving train. These features insure a uniform force of impact and uniform loading between the electrodes and the specimen for each measurement.

In one apparatus in accordance with the invention the two-phase synchronous motor 25 was operated at high speed by the motor driving circuit 40 producing an output of 240 cycles per second at 208 volts r.m.s. The measuring head was lowered a distance of approximately one-fourth inch from its raised position to the intermediate position at which the motor driving circuit 40 produced an output of 60 cycles per second at 115 volts r.m.s. The measuring head moved approximately one-sixteenth inch from the intermediate position to the lowered position at which the electrodes were in contact with the specimen. The shaft 26 was coupled to the motor 25 through speed reduction gears which rotated the shaft 26 at a speed of one revolution per minute when the applied frequency was 60 pulses per second. The shaft 26 rotated through an arc of about 140° to move the measuring head from its raised position to its lowered position. The electrodes were of tungsten carbide with a tip radius of 0.0016 inch. The electrodes were spring mounted in the measuring head to provide a constant force of about 15 grams.

While there has been shown and described what is considered a preferred embodiment of the present invention it will be obvious to those skilled in the art that various changes and modifications may be made therein without departing from the invention as defined in the appended claims.

What is claimed is:

1. Apparatus for measuring a characteristic of a specimen including in combination
    a support for holding a specimen;
    electrodes for contacting a specimen on said support;
    electrode mounting structure for supporting the electrodes;
    driving means for moving the electrode-mounting structure between a first position and a second position at which the electrodes contact a specimen on said support;
    said driving means including
        a synchronous electrical motor;
        a source of electrical pulses connected to the synchronous motor for operating the motor;
        said source of electrical pulses being operable to produce electrical pulses of a first frequency when in a first operating state and to produce electrical pulses of a second frequency less than the first frequency when in a second operating state whereby the motor operates at a first speed when the source is in the first operating state and at a second speed less than the first speed when the source is in the second operating state; and
        means including an electrically operated clutch for coupling the synchronous motor to the electrode mounting structure;
    speed control means for causing the driving means to move the electrode-mounting structure from the first position to a position intermediate the first and second positions at a predetermined distance from the support at a first rate of speed, and to move the electrode mounting structure from the intermediate position to the second position at a rate of speed less than said first rate;
    said speed control means including means for causing the source of electrical pulses to operate in the first operating state when the electrode mounting structure is moving from the first position to the intermediate position and for causing the source of electrical pulses to operate in the second operating state when the electrode mounting structure is moving from the intermediate position to the second position; and
    means for deenergizing the electrically operated clutch when the electrode mounting structure has moved downward into the lowered position.

2. Apparatus for measuring a characteristic of a specimen in accordance with claim 1 wherein
    the first position of the electrode-mounting structure is a raised position and the second position is a lowered position;
and including
    reversing means operable when the electrode-mounting structure is in the raised position for causing the electrode-mounting structure to move downward from the raised position upon subsequent movement thereof and operable when the electrode-mounting structure is in the lowered position for causing the electrode-mounting structure to move upward from the lowered position upon subsequent movement thereof.

3. Apparatus for measuring a characteristic of a specimen in accordance with claim 2 including
    test means for applying electrical signals to said electrodes; and
    test control means for activating said test means a predetermined period of time after the electrode mounting structure has moved into the lowered position and for deactivating said test means when said electrode mounting structure is raised from the lowered position.

4. Apparatus for measuring a characteristic of a specimen in accordance with claim 3 including
    first relay means having a first set of contacts for deactivating the source of electrical pulses when the first relay means is energized and for permitting the source of electrical pulses to be activated when the first relay means is not energized;
    second relay means having a first set of contacts in series with the first set of contacts of the first relay means for deactivating the source of electrical pulses when the second relay means is energized and for permitting the source of electrical pulses to be activated when the second relay means is not energized;
    first relay control means associated with the driving means for energizing the first relay means only when the electrode-mounting structure is in the raised position;
    second relay control means associated with the driving means for energizing the second relay means only when the electrode-mounting structure is in the lowered position;
    downward starting means for deenergizing the first relay means when the electrode-mounting structure is in the raised position; and
    upward starting means for deenergizing the second relay means when the electrode-mounting structure is in the lowered position.

5. Apparatus for measuring a characteristic of a specimen in accordance with claim 4 wherein the first relay means has a second set of contacts for deactivating the clutch when the first relay means is energized and for permitting the clutch to be activated when the first relay means is not energized; and the second relay means has a second set of contacts in series with the second set of contacts of the first relay means for deactivating the clutch when the second relay means is energized and for permitting the clutch to be activated when the second relay means is not energized.

6. Apparatus for measuring a characteristic of a specimen in accordance with claim 5 wherein said reversing means includes a direction control relay means having a first set of contacts for connecting the source of electrical pulses to the motor in a manner to cause rotation of the motor in the direction moving the electrode-mounting structure downward when the directional control relay means is energized and for connecting the source of electrical pulses to the motor in a manner to cause rotation of the motor in the direction moving the electrode-mounting structure upward when the directional control relay means is not energized;

said first relay means has a third set of contacts for causing the directional control relay means to be energized when the first relay means is energized and for permitting the directional control relay means to be deenergized when the first relay means is not energized;

said directional control relay means has a second set of contacts for permitting the directional control relay means to remain energized after the directional control relay means has been energized; and said second relay means has a third set of contacts in series with the second set of contacts of the directional control relay means for permitting the directional control relay means to remain energized when the second relay means is not energized and for causing the directional control means to be deenergized when the second relay means is energized.

7. Apparatus for measuring a characteristic of a specimen in accordance with claim 6 including down starting relay means having a first set of contacts for causing the down starting relay means to remain energized after the down starting relay means has been energized;

down starting switch means for temporarily energizing the down starting relay means;

up starting relay means having a first set of contacts for causing the upstarting relay means to remain energized after the up starting relay means has been energized;

up starting switch means for temporarily energizing the up starting relay means;

said down starting relay means having a second set of contacts associated with the first relay control means for permitting the first relay means to be energized when the down starting relay means is not energized and for causing the first relay means to be deenergized when the down starting relay means is energized;

said down starting relay means having a third set of contacts for permitting the up starting relay means to be energized when the down starting relay means is not energized and for causing the up starting relay means to be deenergized when the down starting relay means is energized;

said up starting relay means having a second set of contacts associated with the second relay control means for permitting the second relay means to be energized when the up starting relay means is not energized and for causing the second relay means to be deenergized when the up starting relay means is energized;

said up starting relay means having a third set of contacts for permitting the down starting relay means to be energized when the up starting relay means is not energized and for causing the down starting relay means to be deenergized when the up starting relay means is energized;

said first relay means having a fourth set of contacts in series with the third set of contacts of the down starting relay means for permitting the up starting relay means to be energized when the first relay means is not energized and for causing the up starting relay means to be deenergized when the first relay means is energized; and said second relay means having a fourth set of contacts in series with the third set of contacts of the up starting relay means for permitting the down starting relay means to be energized when the second relay means is not energized and for causing the down starting relay means to be deenergized when the second relay means is energized.

* * * * *